(12) United States Patent  (10) Patent No.: US 7,114,596 B2
Borugian  (45) Date of Patent: *Oct. 3, 2006

(54) BRAKE SHOE PROXIMITY SENSOR

(75) Inventor: Dennis A. Borugian, High Point, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/425,278

(22) Filed: Apr. 29, 2003

(65) Prior Publication Data

US 2003/0192747 A1   Oct. 16, 2003

Related U.S. Application Data

(63) Continuation of application No. 09/779,863, filed on Feb. 8, 2001, now Pat. No. 6,581,728.

(51) Int. Cl.
F16D 66/00 (2006.01)

(52) U.S. Cl. .............. 188/1.11 E; 188/1.11 R; 188/330

(58) Field of Classification Search ........... 188/1.11 R, 188/1.11 W, 1.11 L, 1.11 E, 78, 325, 330, 188/320; 340/453, 454
See application file for complete search history.

(56) References Cited

U.S. PATENT DOCUMENTS

| 3,533,491 | A | 10/1970 | Svenson |
|---|---|---|---|
| 4,128,146 | A | 12/1978 | Hubbard |
| 4,964,679 | A | 10/1990 | Rath |
| 5,201,834 | A | 4/1993 | Grazioli et al. |
| 5,315,520 | A | 5/1994 | Drake et al. |
| 5,339,069 | A | 8/1994 | Penner et al. |
| 5,403,072 | A | 4/1995 | Kilian et al. |
| 5,410,293 | A | 4/1995 | Angerfors |
| 5,433,296 | A | 7/1995 | Webberley |
| 5,450,930 | A | 9/1995 | Martens et al. |
| 5,559,286 | A | 9/1996 | White et al. |
| 5,648,898 | A | 7/1997 | Moore-McKee et al. |
| 5,689,231 | A | 11/1997 | Olson |
| 5,808,909 | A | 9/1998 | Rees |
| 5,809,437 | A | 9/1998 | Breed |
| 5,812,053 | A | 9/1998 | Kovack |
| 5,825,287 | A | 10/1998 | Zarybnicky, Sr. et al. |
| 5,827,957 | A | 10/1998 | Wehinger |
| 5,835,009 | A | 11/1998 | Hanisko |
| 5,845,975 | A | 12/1998 | Wells |
| 5,848,672 | A | 12/1998 | Brearley et al. |
| 5,890,080 | A | 3/1999 | Coverdill et al. |
| 5,892,437 | A | 4/1999 | Scheibe et al. |
| 5,934,415 | A | 8/1999 | Preston et al. |
| 5,936,153 | A | 8/1999 | Steckler et al. |

(Continued)

Primary Examiner—James McClellan
Assistant Examiner—Bradley T. King
(74) Attorney, Agent, or Firm—Martin Farrell

(57) ABSTRACT

A brake system with an integral proximity sensor for providing an indication of a condition of the brake system. The brake system includes a brake drum, a brake shoe, a brake pad, and a position sensor. The brake pad is connected to a pad mounting surface of the brake shoe. The brake pad and brake shoe are movable from a disengaged position, where the brake pad is spaced apart from the brake drum to an engaged position, where the pad is in forcible engagement with the brake drum. The position sensor is coupled to the brake shoe for sensing the position of the brake shoe with respect to the position sensor. The position of the brake shoe with respect to the position sensor provides an indication of one or more conditions of the brake system.

7 Claims, 5 Drawing Sheets

U.S. PATENT DOCUMENTS

| | | |
|---|---|---|
| 5,936,155 A | 8/1999 | Francois et al. |
| 5,939,978 A | 8/1999 | Kyrtsos |
| 5,962,777 A | 10/1999 | Salamat et al. |
| 5,967,266 A | 10/1999 | Carnegie |
| 5,999,093 A | 12/1999 | Hanisko |
| 5,999,867 A | 12/1999 | Rogers et al. |
| 6,003,640 A | 12/1999 | Ralea |
| 6,006,868 A | 12/1999 | Klink |
| 6,009,355 A | 12/1999 | Obradovich et al. |
| 6,047,793 A | 4/2000 | Hasegawa et al. |
| 6,058,343 A | 5/2000 | Orbach et al. |
| 6,072,389 A | 6/2000 | Strasburger |
| 6,098,760 A | 8/2000 | Seils |
| 6,158,822 A | 12/2000 | Shirai et al. |
| 6,273,218 B1 | 8/2001 | Kramer |
| 6,310,545 B1 | 10/2001 | Sapir |
| 6,341,670 B1 | 1/2002 | Leblanc et al. |

BRAKE SHOE PROXIMITY SENSOR

This is a Continuation application of application Ser. No. 09/779,863, filed on Feb. 8, 2001, now U.S. Pat. No. 6,581,728.

TECHNICAL FIELD

The present invention relates to brake sensors and, more particularly, the present invention relates to a brake shoe proximity sensor for drum brakes of a land vehicle.

BACKGROUND ART

Owners and operators of vehicles having drum brakes need to know the brake's state of adjustment and brake wear to ensure safe operation of a vehicle. Brakes that are out of adjustment may not supply a sufficient amount of stopping power or may drag causing unnecessary wear and may cause the brakes to overheat. Brakes that are worn beyond an acceptable level may not supply a sufficient amount of stopping power for safe operation of the vehicle.

Some drum brakes are actuated by an S-cam or Z-cam assembly. S-cam brakes are actuated by a pneumatically driven push rod, which rotates a cam shaft on which the S-cam is mounted. The S-cam forces a pair of brake shoes against an interior surface of a brake drum. It is known in the art to measure the angular rotation of the S-cam to determine the adjustment of the brakes and wear of the brakes. However, to employ this method calculations must be performed to convert the angular rotation of the S-cam to an estimated travel distance at the brake shoe center. This calculation differs depending on the brake size and type, as well as the effective radius of the S-cam. For example, a different calculation is required for brakes having different diameters, when brakes use a single anchor pin rather than dual anchor pins, and when the effective radius of the cam changes. The computer or system reading the output. of the S-cam type sensors must be configured to calculate the brake shoe travel of the particular brake type and size that it is monitoring.

It is known in the art to use an actuator position sensor to measure brake wear and running clearance adjustment of disc aircraft brakes. Brake wear and running clearance measurements are obtained by analyzing an output of position sensing circuit. Brake disc stack height is measured using actuator position sensors. The output of an actuator position sensor is compared by a controller to a reference brake disc stack height to provide an indication of an amount of brake wear. The displacement measured by the sensor can be used to determine a running clearance position of a reciprocating ram by subtracting a predetermined clearance value from the present displacement value.

Drum brakes for land vehicles are subject to harsh conditions. For example, drum brakes, which are continuously used, become very hot. In addition, drum brakes for land vehicles are exposed to dirt, debris and often salt.

What is needed is a drum braking system having a brake shoe proximity sensor that can be used to measure brake adjustment and brake lining wear on a variety of brake types and sizes without needing to be adjusted for the particular brake type and size being used, and which will hold up under the harsh environment in which drum brakes for land vehicles are operated.

DISCLOSURE OF INVENTION

The present invention concerns a brake system that utilizes a proximity sensor. The system includes a brake shoe that has a pad mounting surface. A brake lining pad is connected to the pad mounting surface of the brake shoe. The brake pad and brake shoe are concentric with a cylindrical surface of a brake drum. The brake shoe and pad are movable between a disengaged position where the brake pad is spaced apart from the cylindrical surface of the brake drum and an engaged position where the brake pad is in forceable engagement with the cylindrical surface of the brake drum. A position sensor is coupled to the brake shoe for sensing a position of the brake shoe relative to the position sensor. The position of the brake shoe relative to the position sensor provides an indication of the condition of the brake system.

The position sensor may utilize radar for sensing the position of the brake shoe. Alternatively, the position sensor may be a linear variable differential transformer or potentiometric displacement transducer which is physically connected to the brake shoe. In one embodiment, a brake spider is operably connected to the brake shoe facilitating movement of the shoe and pad between a disengaged position where the pad is spaced apart from the brake drum and an engaged position where the pad is in forceable engagement with the brake drum. A dust shield is connected to the brake spider. The dust shield has a first side that is oriented toward the brake shoe and a second side that is oriented away from the brake shoe. The dust shield includes an opening for a linkage in one embodiment.

In one embodiment, an insulation barrier is mounted to the second side of the dust shield. The position sensor is mounted to the insulation barrier. A protective coating or a protective cover may be disposed over the sensor. In one illustrated embodiment, the sensor is connected to the brake shoe by a linkage which extends through the opening in the dust shield. The linkage includes a first end that is connected to the position sensor and a second end that is connected to the brake shoe.

The position of a brake shoe is sensed by mounting the proximity sensor to a brake assembly. In one embodiment, the position of a brake shoe is sensed by mounting the proximity sensor to a brake spider backing plate or to a dust shield of the brake assembly. The input of the proximity sensor is coupled to the brake shoe. The proximity sensor detects motion of the brake shoe relative to the proximity sensor and provides an output indicative of the position of the brake shoe.

The proximity sensor of the brake system of the present invention can be used on a variety of sizes and types of brakes, without requiring modification to accurately calculate brake shoe motion for different sizes and types of brakes. In addition, the brake system with an integral proximity sensor constructed in accordance with the present invention is capable of operating when the brakes are at high temperatures for long periods of time and in the harsh environments in which drum brakes for land vehicles operate.

Additional features of the invention will become apparent and a fuller understanding obtained by reading the following detailed description in connection with the accompanying drawings.

BEST MODE FOR CARRYING OUT THE INVENTION

Figure 3:
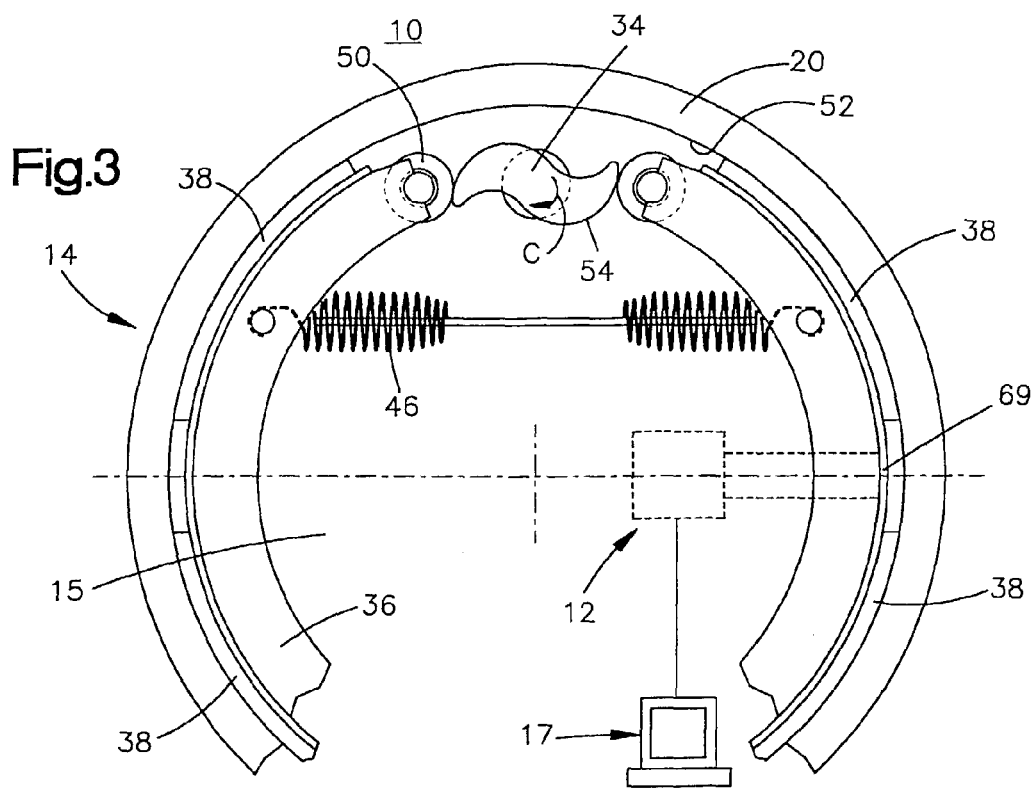
FIG. 3 is a fragmentary front elevational view of a drum braking system in an engaged position.
Figure 2:
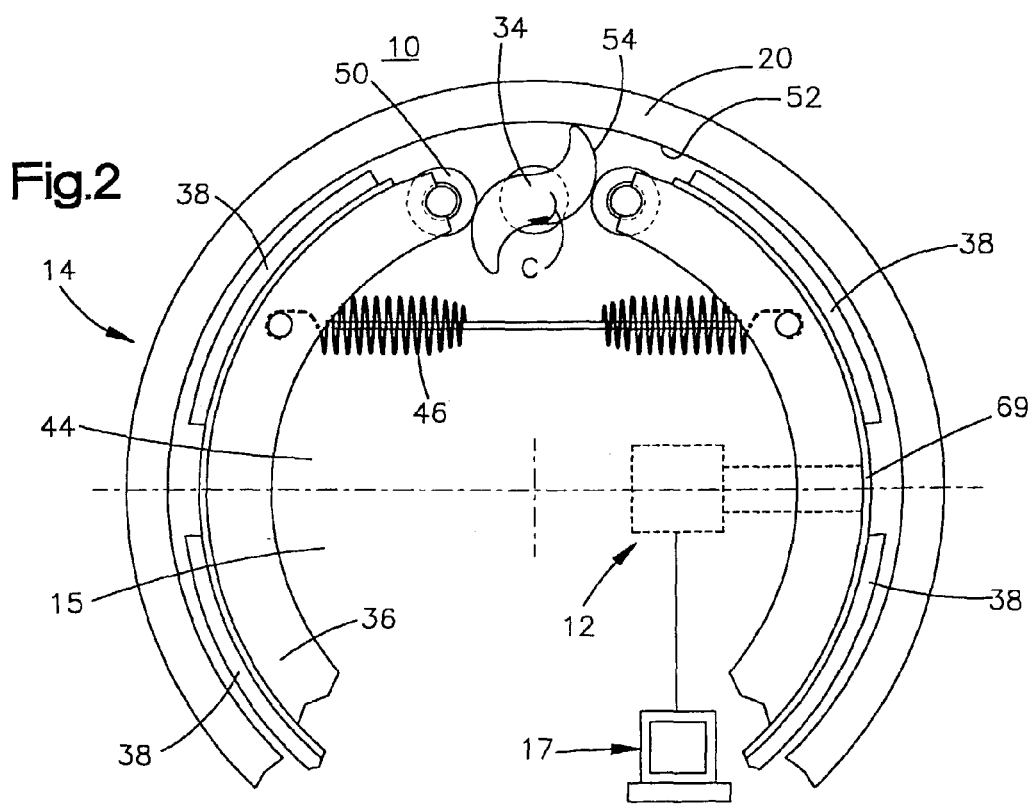
FIG. 2 is a fragmentary front elevational view of a drum braking system in a disengaged position.

The present invention is directed to a brake system 10 with an integral brake shoe proximity sensor 12 (FIGS. 2 and 3) for monitoring and measuring brake lining wear and brake adjustment of a vehicle having drum brakes 14 from inside a vehicle cab (not shown) or from another convenient location. Referring to FIGS. 2 and 3, the proximity sensor 12 is mounted to a typical drum brake. By monitoring the distance between the proximity sensor 12 and a brake shoe 36 brake adjustment and brake wear are calculated and monitored. In the exemplary embodiment, the sensor is coupled to an on-board computer 17 which monitors the brake adjustment and the brake wear.

Figure 1:
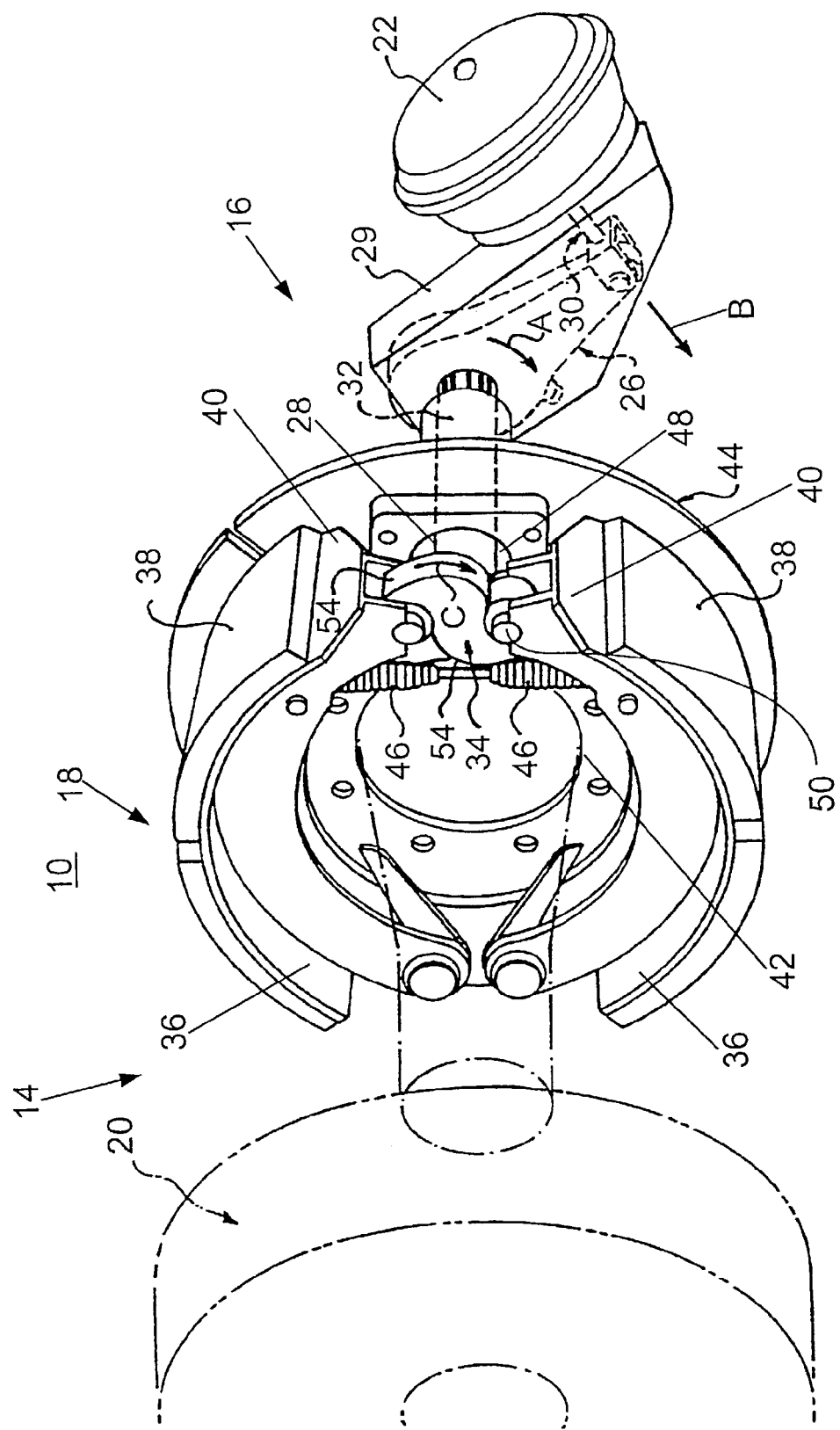
FIG. 1 is an exploded perspective view of a drum braking system.

Referring to FIG. 1, a typical drum brake system includes an actuator 16, a brake shoe assembly 18, and a brake drum 20. The actuator 16 includes a brake chamber 22, a slack adjuster 26, and a cam shaft 28. The brake chamber 22 is mounted to a mounting bracket 29 that is connected to the brake spider or backing plate 42, which is connected to a vehicle axle. The brake chamber 22 contains a diaphragm (not shown) and a push rod 30. The brake chamber converts air pressure behind the diaphragm to linear driving force when the brakes are applied.

As illustrated in FIG. 1, the push rod 30 extends from the brake chamber 22 and is pivotally connected to the slack adjuster 26. The slack adjuster 26 is rotated in direction A by the push rod 30 as the push rod 30 is forced from the brake chamber 22 in a direction B by the diaphragm. The slack adjuster 26 engages splines 32 of the cam shaft 28 so that rotation of the slack adjuster 26 rotates the cam shaft 28 and an S-cam 34 that is attached to an end of the cam shaft 28.

Referring to FIG. 1, the brake shoe assembly 18 includes brake shoes 36, brake pads 38 attached to an outer surface 40 of each of the brake shoes 36, a brake spider 42 or brake spider and a dust shield 44. Generally, rear brake assemblies include a brake spider, which is a casting or heavy stamping. Front brake assemblies typically include a lighter, generally flat backing plate. No dust shield 44 is required when a backing plate is used. Reference character 42 refers to either a brake spider or a backing plate. In the exemplary embodiment, the proximity sensor is mounted to the brake spider or backing plate and/or the dust shield 44. The brake shoes 36 and the brake pads 38 are connected to the brake spider 42 by retainer springs (not shown) and return springs 46 in a manner that is well known in the art. The dust shield 44 is mechanically fastened to the brake spider 42.

Referring to FIG. 1, the cam shaft 28 extends through an opening 48 in the brake spider 42 and an opening (not shown) in the dust shield 44. The brake shoe assembly 18 includes cam rollers 50 on the brake shoes. The return springs 46 force the cam rollers 50 against the S-cam 34 or a Z-cam (not shown). Referring to FIGS. 2 and 3, rotating the S-cam 34 acts on the cam rollers 50 to force the brake shoes 36 and pads 38 to spread apart, bringing the pads 38 into frictional engagement with an interior surface 52 of the brake drum 20.

As illustrated in FIGS. 1–3, the S-cam 34 has S-shaped cam surfaces 54. The cam rollers 50 on the brake shoes 36 are urged against the cam rollers 50 by the return biasing springs 46. Rotating the S-cam 34 in direction C forces the cam rollers 50 to follow divergent paths on the S-shaped cam surfaces 54 thereby forcing the brake shoes 36 and pads 38 apart. Rotating the cam shaft 28, either by applying the brakes, causing the push rod 30 to rotate the slack adjustor 26, or by adjusting the slack adjuster 26, moves the brake pads 38 closer to the brake drum 20.

The brake pads 38 and brake drum 20 wear due to repeated application of the brakes. The brake shoes 36 must move farther to force the brake pads 38 against the brake drum 20 as the brake pads 38 wear. The slack adjuster 26 (FIG. 1) must be adjusted to compensate for the brake pad 38 wear and for wear of the interior surface 52 of the brake drum 20. Referring to FIG. 1, the length of the push rod 30 that extends from the brake chamber 22 increases as the push rod is forced out of the brake chamber 22 by the diaphragm. The distance that the diaphragm moves within the brake chamber 22 translates directly into movement of the pushrod 30. Typically, the maximum usable pushrod travel is approximately 1½" to 2½".

Travel of the push rod 30 results in only a small rotation of the slack adjuster 26 and cam shaft 28. If, before the brakes are applied, the brake pads 38 are not in close proximity to the interior surface 52 of the brake drum 20, the maximum pushrod travel will be insufficient to bring the brake pads 38 into frictional engagement with the brake drum 20. This situation is known in the art as "brakes out of adjustment." The brakes may be adjusted by adjusting the slack adjuster in a manner well known in the art when the brakes are not applied. Some slack adjusters adjust automatically. Adjusting the slack adjuster 26 will, if the brake pads 38 and brake drum 20 are not overly worn, bring the brakes back into adjustment by moving the brake pads 38 back into close proximity with the brake drum 20, when the pushrod 30 is in a retracted position. However, if the brake pads 38 and brake drum 20 are excessively worn, adjustment of the brakes will not bring the brake pads 38 close enough to the interior surface 52 of the brake drum 20 to cause frictional engagement to occur when the brakes are applied.

The braking force of the brakes is greatly reduced when the brakes are out of adjustment. It is the responsibility of the operator of the vehicle to ensure that the brakes are adjusted correctly. In most prior art systems, this meant that the operator had to stop at every brake check point and crawl under the vehicle to inspect the brakes and, if necessary, adjust the brakes.

By monitoring the position of the brake shoe, an accurate indication of the brake adjustment may be obtained and displayed to the operator of the vehicle. The signal provided to the operator will advise the operator to adjust the brakes before they become out of adjustment. Properly adjusted brakes will have a push rod stroke of approximately ⅜" to ½" and a maximum brake shoe travel 36 of approximately 0.025" at the shoe center. The push rod stroke and brake shoe travel increases when the distance between the brake pad 38 and the brake drum increases due to brake pad wear and brake drum wear. The distance may also increase due to heating of the brake drum, causing it to expand. This phenomenon is known as mechanical brake fade. As the temperature of the system rises beyond a critical point, the brake lining itself becomes adversely affected and its frictional co-efficient decreases, further reducing the braking system's retardation force.

In most prior art systems, to check brake wear (i.e., the amount of brake pad left), the mechanic or operator was required to crawl under the vehicle, and remove a small inspection plug (not shown) from an inspection hole or slot (not shown) in the dust shield 44.

In the exemplary embodiment, brake wear and brake adjustment are monitored by monitoring the distance from the brake shoe 36 to the proximity sensor 12. Brake wear and adjustment are displayed to an operator of the vehicle by monitoring the absolute position of the brake shoe 36 with respect to the proximity sensor 12.

Figure 4:
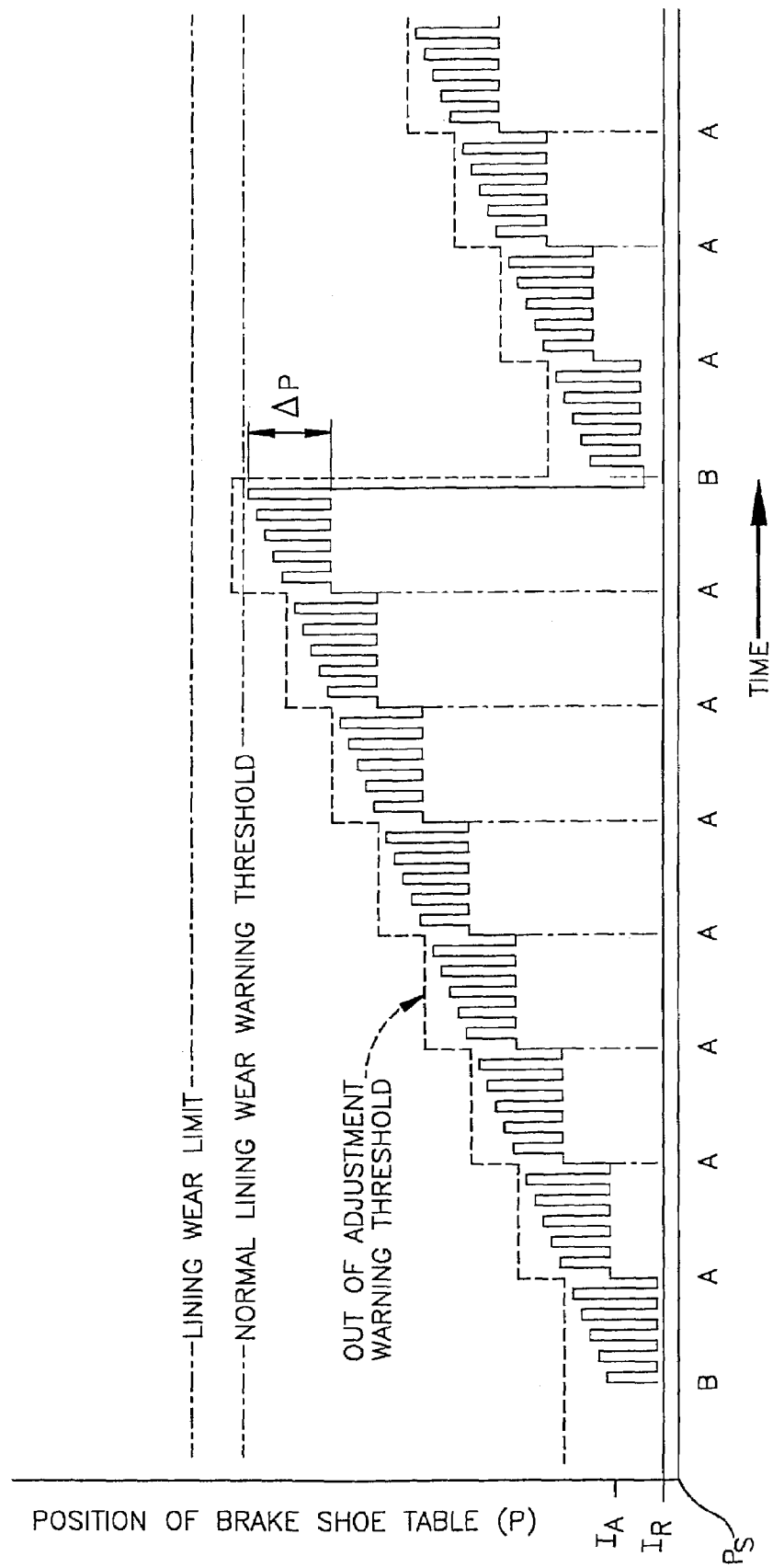
FIG. 4 is a graph of a brake shoe table position versus time through a maintenance cycle.

FIG. 4 is a plot showing the variation of the brake shoe position over time as the brakes are repeatedly applied. The points along the time legend labeled "B" represent times when the brake pads were changed and the points labeled "A" represent times when the brakes were adjusted. In FIG. 4, $P_S$ represents the fixed position of the proximity sensor 12. $P_{IR}$ represents the initial released position of the brake shoes when the brake linings are new, the brake drum is unworn and the brakes are properly adjusted. $P_{IA}$ represents the initial applied position of the brake shoes when the brake linings are new. Each time the brakes are applied, the brake shoes 36 move away from the position sensor and toward the interior surface 52 of the brake drum 20. When the brakes are released, the brake shoes 36 move back to their starting position $P_{IR}$. Each pulse of the graph of FIG. 4 corresponds to one application and release of the vehicle brakes. Each time the brakes are applied, the brake pads 38 and brake drum 20 wear slightly so that the brake shoe must move further the next time the brakes are applied to engage the brake drum 20. With respect to FIG. 4, this results in pulses of increasing height for subsequent brake applications.

The adjustment of the brakes can be determined by measuring the distance the brake shoes 36 travel during each application of the brakes. The position of the brake shoes 36 is measured for each application and release of the brakes. The maximum travel of the brake shoes 36 produced by the actuator 16 is known for any given brake assembly. When the travel of the brake shoes 36, monitored by the proximity sensor 12 is approached or reached, the system indicates that the brakes need adjusting. In the exemplary embodiment, a warning is given to the operator when the brake shoe and corresponding push rod travel approach the maximum brake shoe and push rod travel specified by the brake manufacturer, alerting the operator that the brakes must be adjusted.

Referring to FIG. 4, brake lining wear can be monitored by measuring the absolute distance D of the brake shoe 36 relative to the position sensor 12. The initial position of the brake shoes with respect to the position sensor 12 is recorded when the brake pads are new. As the brake pads 38 wear, the distance between a properly adjusted brake shoe and the proximity sensor 12 increases, giving an indication of the brake wear. The usable thickness (T) of the brake pads 38 is known when new brake pads are installed. The wear of the inner surface 52 of the brake drum 20 is generally negligible in comparison with the wear of the brake pads 38. Ignoring the wear of the brake drum 20, wear (W) of the brake pads 38 is calculated by the equation:

$$W = P - P_*$$

where W is the thickness of brake lining worn away, P is the position of the brake shoe monitored by the proximity sensor and $P_*$ is the initial position of the brake shoe when the brake pads were installed. The monitored position P and the initial position $P_*$ may be the applied position or released position of the brake shoes 36. In the exemplary embodiment, the initial applied position $P_{IA}$ of the brake shoe is compared to the position of the brake shoe when the brakes are applied to determine brake pad wear, since the brakes state of adjustment does not effect the calculation when the applied position is used. The remaining usable thickness ($T_R$) of the brake pads 38 is equal to the brake wear (W) subtracted from the initial usable thickness ($T_I$) of the brake pads. ($T_R = T_I - W$) In the exemplary embodiment, an alarm is triggered when the position of the brake shoes indicates that the brake pads 38 are nearly worn out. In one embodiment, the remaining usable brake lining thickness can be selectively displayed and is automatically displayed when the alarm is triggered.

The brake drum 20 also wears as the brakes are applied, but the brake drums are generally not replaced as often as the brake pads 38, since the wear of the brake drum is much less than the wear of the brake pad. When the brake pads 38 are replaced and the brakes are adjusted but the brake drums are not replaced, the position of the brake shoes 36 returns to an adjusted position that is slightly greater than the initial position $P_{IR}$ due to wear of the brake drum.

Figure 6:
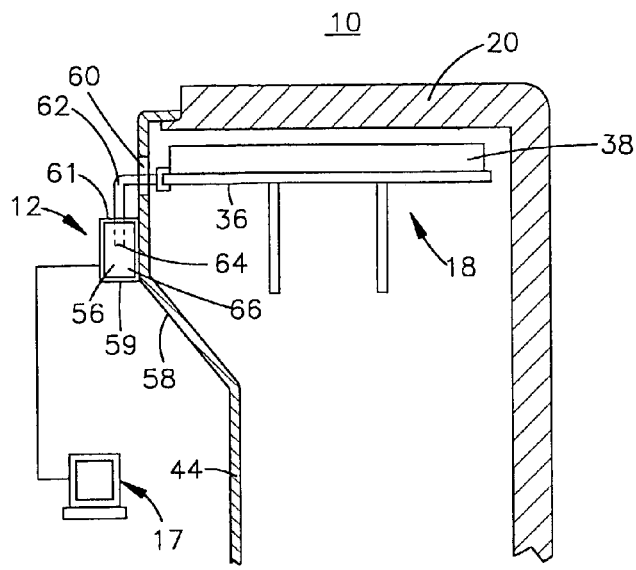
FIG. 6 is a schematic representation of a brake system with a linear potentiometer coupled to a brake shoe.

Referring to FIG. 6, the position of the brake shoes 36 is measured by a linear potentiometer 56 that is mounted to an outer surface 58 of the dust shield 44 in one embodiment. The dust shield protects the linear potentiometer from heat generated by the brakes and brake dust. In the exemplary embodiment, an insulation barrier 59 is disposed between the linear potentiometer and the dust shield 44 to further protect the linear potentiometer from heat generated by the brakes. In the exemplary embodiment, a protective covering 61 encases the linear potentiometer to protect it from the elements. In this embodiment, the dust shield includes an opening 60 that a linkage 62 of the linear potentiometer extends through. The linkage 62 is mechanically fastened to the brake shoe 36. When the brake shoe 36 moves into and out of engagement with the brake drum 20, the linkage 62 moves with the brake shoe 36 causing an end 64 of the linkage to move within a body 66 of the linear potentiometer.

Movement of the linkage 62 with respect to the body 66 of the linear potentiometer produces an analog electrical output proportional to the position of the brake shoe 36. The analog output is used to determine the position of the brake shoe 36 with respect to the linear potentiometer, allowing determination of brake adjustment and brake wear according to the method disclosed above. One linear potentiometer that may be used is Model #LCP 12-12 produced by Precision Sales located in Newton Square, Pa., which can handle a ½" stroke. A second linear potentiometer that may be used is Model "LCP 1225 produced by Precision Sales, which can handle a 1" stroke.

Figure 7:
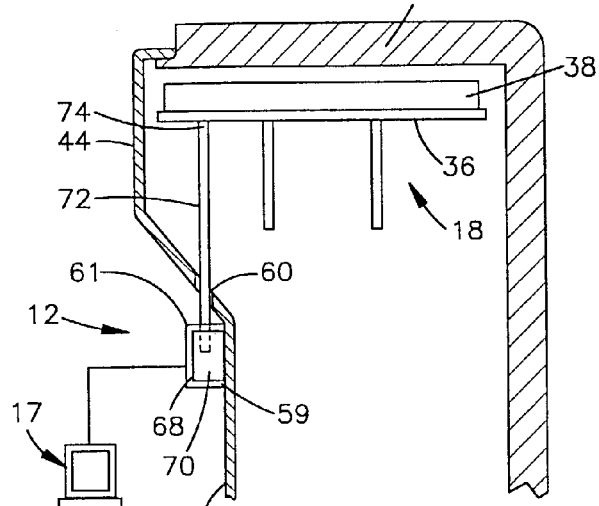
FIG. 7 is a schematic representation of a brake system with a linear variable differential transformer coupled to the brake shoe; and, FIG. 8 is a schematic representation of a brake system with a radar transmitter and receiver positioned to monitor the position of the brake shoe.

Referring to FIG. 7, a linear variable differential transformer 68 is used to measure the position of the brake shoes 36 in a second embodiment. The linear variable differential transformer 68 includes a body 70 that is mounted to the outer surface 58 of the dust shield 44. The dust shield protects the linear variable differential transformer from heat generated by the brakes and brake dust. In the exemplary embodiment, an insulation barrier 59 is placed between the linear variable differential transformer 68 and the dust shield 44 to further protect the linear variable differential transformer from heat generated by the brakes. In the exemplary embodiment, a protective covering 61 surrounds the linear variable differential transformer to protect it from the harsh environment in which vehicles are drive In this embodiment, the opening 60 in the dust shield 44 is aligned with the body 70 of the linear variable differential transformer 68. A linkage 72 of the linear variable differential transformer extends from the body 70 of the linear variable differential transformer extends through the opening 60 in the dust shield 44. An end 74 of the linkage is coupled to the brake shoe 36.

Movement of the linkage 72 within the body 70 of the linear variable differential transformer 68 produces a signal that is proportional to the position of the brake shoe 36. The signal output of the linear variable differential transformer (LVDT) is proportional to the distance the brake shoe moves relative to the LVDT 68. One LVDT which may be used is Model #LD-600 produced by Omega, which is a high accuracy DC long stroke displacement transducer.

Figure 8:
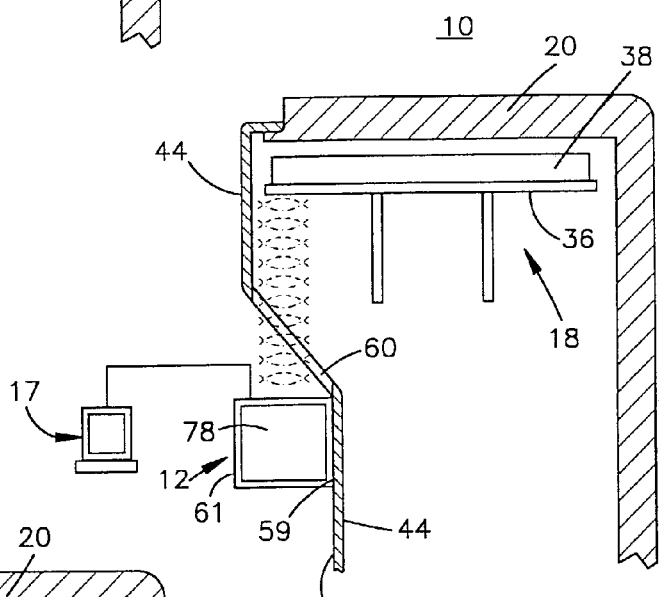

Referring the FIG. 8, in a third embodiment, the proximity sensor 12 is a radar transmitter and receiver 78. The radar transmitter/receiver is mounted to the outer surface 58 of the dust shield 44. The dust shield protects the radar transmitter and receiver 78 from heat generated by the brakes used and brake dust. In the exemplary embodiment, an insulation barrier 59 is placed between the radar transmitter and receiver 78 and the dust shield 44 to further protect the radar transmitter and receiver 78 from heat generated by the brakes. In the exemplary embodiment, a protective covering 61 surrounds the radar transmitter and receiver 78 to protect it from the harsh environment in which vehicles are driven. In this embodiment, the dust shield opening 60 is located such that radar can be transmitted through the dust shield 44 to the brake shoe 36, be reflected off the brake shoe back through the opening 60 and be received by the radar receiver. The radar transmitter/receiver provides an output indicative of the position of the brake shoe 36 with respect to the radar transmitter/receiver 78. This output is used to determine the brake's state of adjustment and wear of the brake pad 38.

Referring to FIGS. 2 and 3, the proximity sensor 12 is aligned with the center 69 of the brake shoe 36 in the exemplary embodiment. Monitoring the position of the center of the brake shoe gives a more accurate indication of the adjustment and wear of the brakes. By monitoring the brake shoe travel directly at the shoe center, further calculations are not required and the measurement is not affected by tolerances of other components. By way of contrast, systems which measure the angular rotation of a cam are adversely affected by bearing wear in camshaft bracket bushings. The proximity sensor of the present invention can be used, regardless of the brake size, brake type, or effective camshaft radius.

Figure 5:
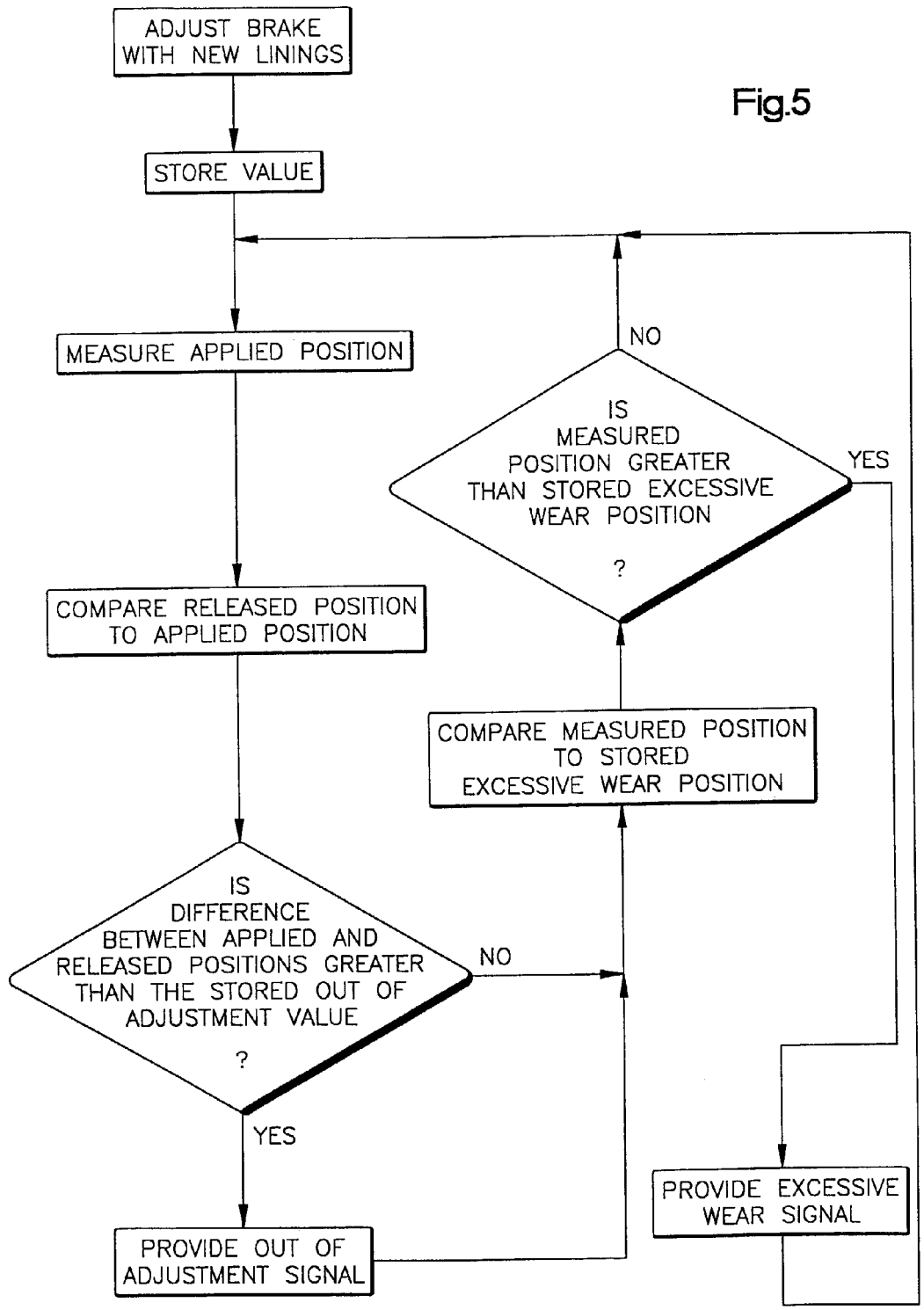
FIG. 5 is a block diagram illustrating the steps of a method for monitoring brake adjustment and brake wear.

FIG. 5 is a flow chart of the steps that are performed to monitor brake adjustment and brake wear with the present invention. New brake pads 38 are applied to the brake shoes 36 and the brakes are properly adjusted. Then, the initial positions $P_{IR}$ and $P_{IP}$ of the brake shoe with respect to the proximity sensor 12 and the initial brake pad thickness 80 is stored. Also stored is the distance between the brake shoe and brake pad corresponding to brakes about to become out of adjustment. This is the distance the shoe must travel from the released position to the applied position to allow contact to occur between the brake shoe lining and the drum. Additionally, the amount of brake pad wear that is acceptable before the brake pads should be changed is stored. When the brakes are applied, the proximity sensor 12 measures the distance from the proximity sensor 12 to the brake shoe 36. When the brakes are released, the proximity sensor measures the distance from the brake shoes 36 to the proximity sensor 12. The measured applied position is compared to the measured release position. If the difference between the measured applied and release positions is greater than the stored "out of adjustment" value the onboard computer 17 will provide an out of adjustment signal to the operator of the vehicle in the vehicle cab. Details on the manner in which signals are relayed to the operator of the vehicle are disclosed in the patent application entitled "Vehicle Diagnostic System," filed on the same day as the present invention, assigned to the assignee of the present invention and incorporated herein by references. The on-board computer 17 then compares one of the measured applied or released positions and compares it to a stored excessive wear position. If the measured position is greater than the stored excessive wear position, the on-board computer 17 provides an excessive wear signal to the operator of the vehicle in the vehicle cab, indicating that the brake pads should be changed. This process is repeated each time the brakes are applied and released in the exemplary embodiment. In the exemplary embodiment, the on-board computer is a Volvo Action Link System, Volvo Part No. 20437887.

A computer program is used to perform the comparing and signaling steps in the exemplary embodiment. Several thresholds may be stored for any of the above calculations. For example, the program may be designed to give a warning when the brakes are approaching an out of adjustment condition and may be programed to give warnings for different states of brake wear. This allows the operator to plan maintenance well in advance. The computer may monitor input from sources other than the proximity sensor 12. For example, the brake temperature may be measured by a temperature sensor, or tire ply temperature may be measured by a temperature sensor.

Although the present invention has been described with a degree of particularity, it is the intent that the invention include all modifications and alterations falling within the spirit and scope of the appended claims.

I claim:

1. A brake system with an integral position sensor, comprising:
   a) a brake drum having a cylindrical surface;
   b) a brake shoe having a pad mounting surface;
   c) a brake lining pad connected to said pad mounting surface of said shoe, said pad and shoe being concentric with said cylindrical surface, said shoe and pad being movable between a disengaged position wherein said pad is spaced apart from said cylindrical surface to an engaged position wherein said pad is in forcible engagement with said cylindrical surface;
   d) an actuator coupled to the brake shoe for moving the shoe and an associated pad between the disengaged position and the engaged position; and
   e) a position sensor mounted on a surface outside the brake drum such that said position sensor is shielded from heat and dust generated by said brake shoe and said brake drum, comprising a mechanical linkage that extends through an opening in said surface, said linkage includes a first end connected to said brake shoe and a second end connected to said sensor, wherein said position sensor is coupled directly to said brake shoe, said position sensor is arranged for sensing a change in position of the shoe relative to the position sensor when the brake shoe is moved between the disengaged and engaged positions and to thereby provide an indication of a condition of the brake system.

2. The brake system of claim 1 wherein said surface is oriented away from said brake shoe.

3. The brake system of claim 1 wherein said position sensor is a linear variable differential transformer.

4. The brake system of claim 1 wherein said position sensor is a potentiometric displacement transducer.

5. The brake system of claim 1 wherein said position sensor is aligned with the center of the brake shoe.

6. The brake system of claim 1 further comprising an insulation barrier disposed between said brake shoe and said position sensor.

7. The brake system of claim 1 wherein said brake shoe is pneumatically actuated.

* * * * *